US008666448B2

(12) United States Patent
Prakash et al.

(10) Patent No.: US 8,666,448 B2
(45) Date of Patent: Mar. 4, 2014

(54) HEADLESS EXTERNAL SENSOR DISCOVERY AND DATA ACCESS USING MOBILE DEVICE

(75) Inventors: Gyan Prakash, Beaverton, OR (US);
Kannan G. Raja, Beaverton, OR (US);
Brian J. Hedges, Hillsboro, OR (US);
Selim Aissi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 13/093,635

(22) Filed: Apr. 25, 2011

(65) Prior Publication Data

US 2012/0270505 A1 Oct. 25, 2012

(51) Int. Cl.
*H04M 1/00* (2006.01)
*H04B 1/38* (2006.01)
(52) U.S. Cl.
USPC ..................................... 455/557; 340/539.26
(58) Field of Classification Search
USPC ......... 455/66.1, 500, 507, 508, 557; 340/571, 340/500, 506, 539.26; 235/435
See application file for complete search history.

(56) References Cited

U.S. PATENT DOCUMENTS

| 7,149,654 | B2 * | 12/2006 | Ramsdale et al. | ............. 702/182 |
| 7,839,280 | B2 * | 11/2010 | Peters et al. | ............. 340/539.22 |
| 2009/0284376 | A1 * | 11/2009 | Byun et al. | ................. 340/572.1 |
| 2010/0017138 | A1 * | 1/2010 | Brady et al. | ..................... 702/14 |
| 2011/0279259 | A1 * | 11/2011 | Jackson | ........................ 340/506 |

OTHER PUBLICATIONS

International Search Report and Written Opinion for International Application No. PCT/US2011/067058, mailed Aug. 31, 2012, 9 pages.
Kahn et al., "Next Century Challenges: Mobile Networking for Smart Dust," MobiCom '99, Proceedings of the 5th Annual ACM/IEEE International Conference on Mobile Computing and Networking, 1999, pp. 271-278.
Wikipedia contributors, "Sensor Node," Wikipedia, The Free Encyclopedia, http://en.wikipedia.org/wiki/Sensor_node, last modified Jan. 15, 2012, 4 pages.
Pister et al., "Smart Dust: Autonomous Sensing and Communication in a Cubic Millimeter," http://robotics.eecs.berkeley.edu/~pister/SmartDust/, last modified Nov. 24, 2009, 5 pages.
Hsu et al., "Wireless Communication for Smart Dust," Electronics Research Laboratory Memorandum No. M98/2, Jan. 30, 1998, 22 pages.

* cited by examiner

*Primary Examiner* — Ping Hsieh
(74) *Attorney, Agent, or Firm* — Barnes & Thornburg LLP

(57) ABSTRACT

A device, system, and machine readable medium for headless sensor measurements are disclosed. In one embodiment, the device is exclusive of a display. The device includes a sensor head to retrieve an amount of measurement data from an environment. The device also includes an I/O interface, a memory, a non-volatile storage, processing logic, and sensor data access protocol (SDAP) manageability code. The SDAP manageability code may cause the processing logic to provide a sensor type and a measurement data payload type to a mobile communication device. The SDAP manageability code additionally may cause the sensor head to take a measurement, receive measurement data from the sensor head, packetize the measurement data, and transfer the measurement data payload to the mobile communication device.

20 Claims, 3 Drawing Sheets

HEADLESS EXTERNAL SENSOR DISCOVERY AND DATA ACCESS USING MOBILE DEVICE

FIELD OF THE INVENTION

The invention relates to environmental sensor devices, including headless sensor devices.

BACKGROUND OF THE INVENTION

There are many instances where it may be desirable to have thousands of measurements of a resource (e.g. a natural resource) in many different physical locations. For example, the ability to measure the cleanliness of air or water would be useful, but the ability to measure the cleanliness of air or water with thousands, or perhaps millions, of data points across a wide geographical region in many aspects would be even more useful and important.

Normally, these types of mass measurements would be difficult and costly. In other words, taking measurements at a fine granularity (i.e., a small physical distance between each measurement) but having the entire scope of the measurements spanning a large distance (i.e., spanning a city, region, country, etc.) might require tens of thousands of sensor devices and a large logistical deployment operation.

Additionally, if the sensors simply stored captured measurements internally, it could very well be impracticable to have thousands of sensors each take data over a period of time and then require people to manually gather the data from each sensor. On the other hand, designing each sensor to be able to wirelessly send back data would increase the cost of the stand-alone sensor device as a whole. For example, when thousands of sensors might be needed to gain an accurate picture of an hour-by-hour change in the air quality at a detailed level across a large city such as Los Angeles or Shanghai, the cost of the sensor array may become prohibitive.

Currently, air and water quality sensor devices generally are bulky and include display panel(s), keys for user input, batteries or AC adapters, storage media to store the measurement data, as well as a processor and memory to process the measurement data taken.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a device, system, and method for headless sensor measurement collection are described.

Figure 1:
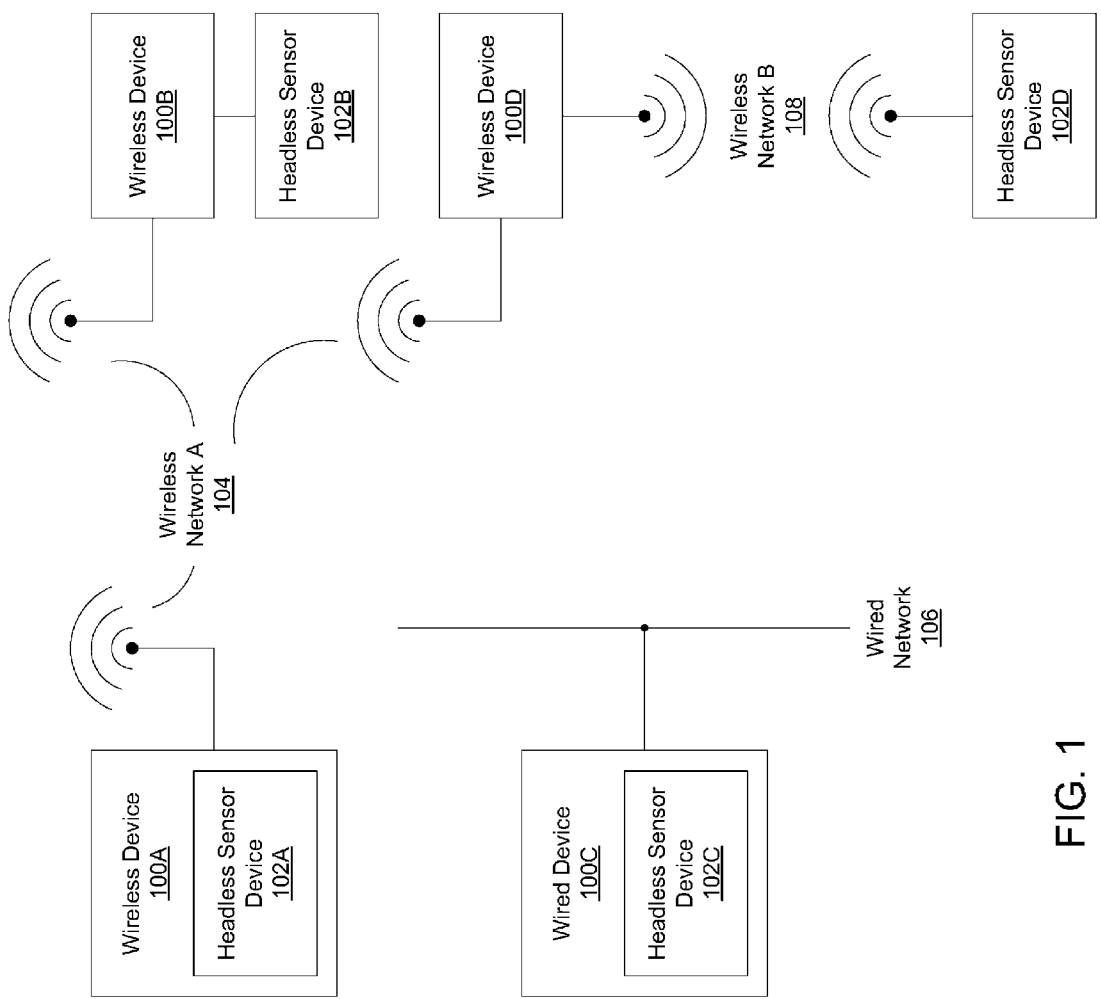
FIG. 1 illustrates a group of headless sensor devices (100A-100D) in many embodiments.

FIG. 1 illustrates a group of headless sensor devices (100A-100D) in many embodiments. The group may include one or more headless sensor devices and in many cases it may include a great deal of headless sensor devices (e.g., hundreds, thousands, millions, etc.). The term "headless" generally refers to a sensor device that includes all necessary processing logic to take, store, and send measurements, but without a user interface at the sensor. For example, in many cases a sensor device that takes analog and/or digital measurements also includes dedicated user input and display devices such as a keypad, a display screen, etc. A headless sensor device dispenses with the user interface and therefore is capable of a much smaller form factor, which may be integrated into another device or as a standalone headless sensor device.

Each headless sensor device may include one or more specific measurement sensors. For example, one sensor may measure particulates in the air, another may measure air temperature, another may measure barometric pressure, yet another may measure wind speed. In other examples, sensors that measure water temperature and qualities may be utilized. Still other examples may include ground and/or water movement sensors, among others. Several of these measurement sensors may be combined within a single headless sensor device in some embodiments. In other embodiments, the headless sensor device simply includes one measurement sensor.

In many embodiments, a headless sensor device includes at least a measurement sensor as well as processing logic to retrieve, store, and/or send measurement data originating from the headless sensor device. This processing logic may contain one or more components. In many embodiments, due to the logistical issues associated with manually retrieving measurement data from each sensor device location, each sensor device may be coupled to a wireless device (102A-102B) or a wired device (102C-102D) where each wireless/wired device may be capable of communicating with a wired (104) or wireless (106) network, respectively. Communicatively coupling each device to a network may allow measurement data from many headless sensor devices to be pooled at a central data pool/repository, also coupled to the respective network, or coupled to a separate network which allows inter-network communications with the network the headless sensor devices are coupled to. In order to enable this communication, each wireless/wired device may include communication logic to transmit communications over the one or more networks.

The headless sensor device and wired/wireless (i.e. mobile) communication device pair may take one of several forms. Some examples in FIG. 1 include wireless device 100A that integrates a headless sensor device 102A within itself. wireless device 100B that is coupled to a separate headless sensor device 102B, wired device 100C that integrates a headless sensor device 102C within itself, and wireless device 100D that is wirelessly coupled to a separate headless sensor device 102D through a secondary wireless network B 108. In some embodiments, wireless network B 108 may be a Bluetooth® or other low power wireless network.

Each network shown may come in any one of many forms. For example, wireless network 104 may be in the form of a cellular network, a WiMAX network, an IEEE 802.11-based network, a satellite communication-based network, or any one of many other forms of wireless communication networks. Wired network 106 may be an Ethernet-based network, a coaxial cable-based network, a digital subscriber line-based network, a power line network, or any one of many other forms of wired networks.

Figure 2:
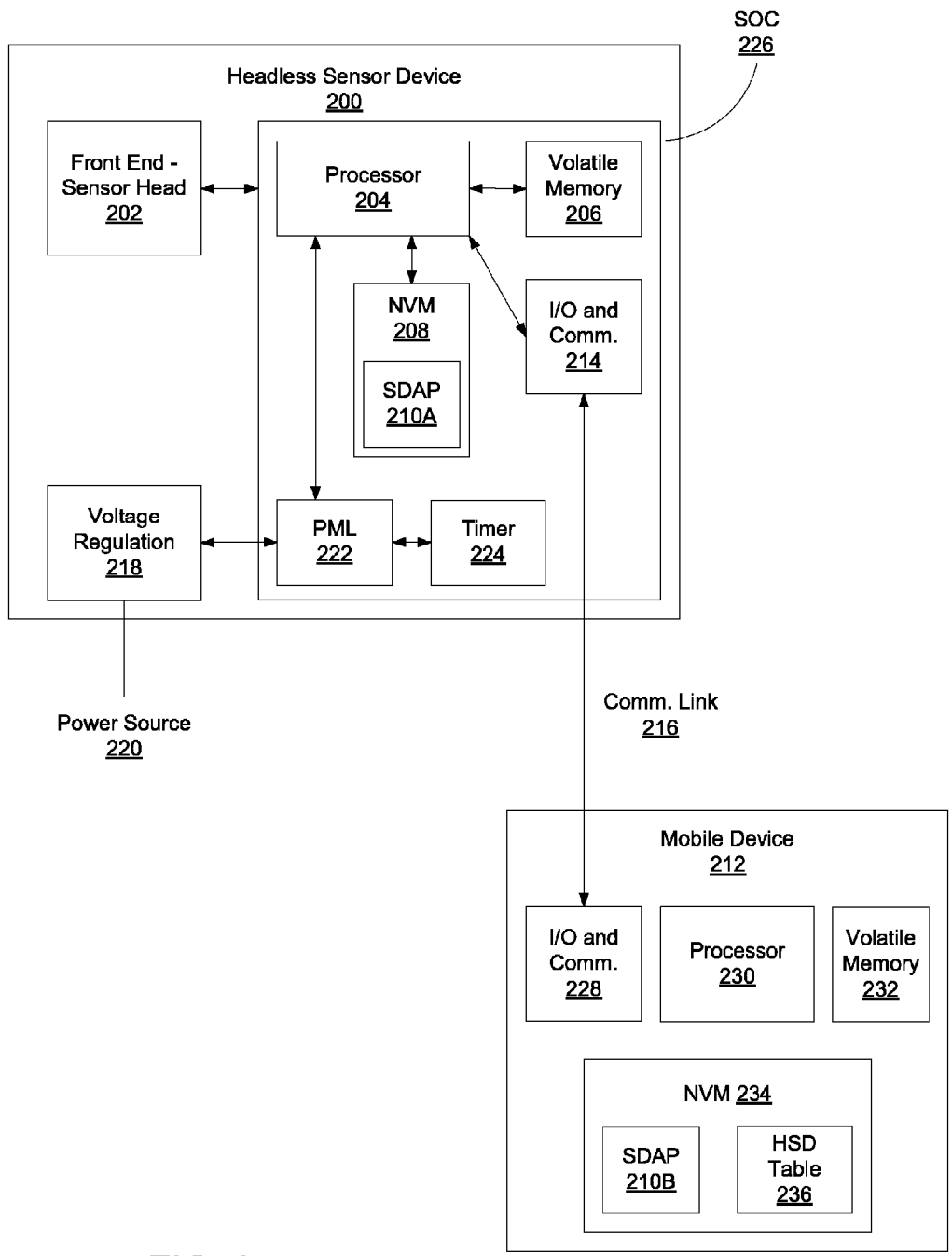
FIG. 2 illustrates an embodiment of the headless sensor device.

FIG. 2 illustrates an embodiment of the headless sensor device. There are many possibilities as to the composition of each headless sensor device deployed within the group of headless sensor devices shown in FIG. 1. The headless sensor device 200 in FIG. 2 shows a potential common arrangement of components that may comprise the headless sensor device. In many embodiments, the headless sensor device may include at least one sensor head 202, which serves as the front end, and primary purpose, of the headless sensor device 200. The sensor head 202 comprises the measurement sensor itself (e.g., a thermometer, barometer, etc.). In some embodiments the sensor head 202 outputs analog data. In other embodiments, the sensor head 202 includes an analog-to-digital (A/D) convertor (not shown), which allows the sensor head 202 itself to convert measured analog data and output digital data directly.

Coupled to the sensor head 202 may be a processor 204 to perform simple tasks such as retrieving the measurement data from the sensor head 202. If the sensor head 202 outputs analog data, the processor 204 may be required to process the analog data and convert it into digital data. The processor 204 may be coupled to a volatile memory 206 for temporary storage of data structures and instruction code to be operated upon by the processor 204. Due to the limited nature of the operations performed by processor 204, the volatile memory 206 may be relatively small. In some embodiments, the volatile memory may comprise a type of dynamic random access memory. Though in other embodiments, other forms of volatile memory may be utilized.

Furthermore, the processor 204 may also be coupled to non-volatile memory (NVM) storage 208. The NVM 208 includes storage space which may store collected measurement data from the sensor head 202. The NVM storage 208 may also store a sensor data access protocol (SDAP) manageability code 210A. The SDAP manageability code 210A may comprise firmware and include instructions for the headless sensor device to communicate with one or more mobile devices, such as mobile communication device 212 (e.g., a wireless or wired device from FIG. 1). In many embodiments, mobile communication device 212 may comprise a laptop computer, a cellular telephone (e.g., a smartphone), a tablet device, a netbook computer, or any other type of mobile computing device capable of communicating wirelessly with one or more other devices.

Additionally, I/O and communication logic 214, coupled to the NVM storage 208 and the processor 204 in many embodiments, provides hardware circuitry to enable a communication link 216 between the headless sensor device 200 and one or more mobile devices, such as mobile communication device 212.

In some embodiments, communication link 216 may be a wireless link, such as a Bluetooth® link, an IEEE 802.11-based link, a cellular telephone link, or any other type of wireless link capable of allowing wireless electronic data transfer between the headless sensor device 200 and mobile communication device 212. In other embodiments, communication link 216 may be a wired link, such as a Universal Serial Bus (USB) link, an Ethernet link, or any other form of wired communication link that allows for electronic data transfer between the two devices.

The mobile communication device 212 includes SDAP 210B manageability code. SDAP 210B manageability code includes instructions that allow the mobile communication device 212 to communicate with the headless sensor device 200. In some embodiments, SDAP 210B manageability code may comprise driver software for the headless sensor device, which creates a logical communication path to the headless sensor device 200. The SDAP 210B manageability code provides a discovery protocol that allows an interface into the headless sensor device 200 functionality. Examples of functions the headless sensor device 200 is capable of may include some or all of the functions listed in Table 1.

TABLE 1

Example Headless Sensor Device Functions

| Function | Description |
| --- | --- |
| Sensor Type Detection | This function will return the specific type of sensor. E.g., a barometric pressure sensor. |
| Sensor Payload Details | This function will return the information and the format of the information returned within the payload sent from the headless sensor device to the mobile communication device. E.g., a packet of data including a time stamp of the retrieval time of sensor measurement data and the actual measurement data retrieved. |
| Sensor Protocol Version | This function will return the protocol version of the sensor, which may allow a compatibility check with the SDAP 210B manageability code in the mobile communication device. |
| Data Transfer Type | This function will return whether the data transfer of the measurement payload is set to be delivered wirelessly or over a wired connection. |
| Read Preset/Configuration Information and Initialization | This function will return preset configuration data relevant to the headless sensor device data measurement, potentially during an initialization phase. |
| Mode of Operation | This function will return the mode of operation the headless sensor device is operating within. E.g., the headless sensor device may be operating in a calibration mode to calibrate the sensor for accurate measurements or it may be operating in a data gathering mode to actually gather the measurement data retrieved from the sensor head. |
| Iterations/Length of Data Collection | This function will return actual aspects of the data collection. E.g., the number of iterations of retrieving a measurement from the measurement head, the length of time that data collection will be performed prior to the headless sensor device shutting down further measurements from the sensor head, the accumulation speed of the measurements (time between measurements), etc. |
| Local Storage Option | This function will return an acknowledgement of whether the headless sensor device will be storing the collected measurement data temporarily on internal storage or whether the payload(s) with the measurement data will be directly transferred to the mobile device immediately upon each measurement, effectively circumventing the storage step. |
| Transfer Data | This function will return the measurement data in the payload as defined by the Sensor payload details function. |
| Complete Transfer | This function will provide a verification that the measurement data payload transfer has been completed. |
| Open Connection | This function will attempt to establish a communication connection with the headless sensor device. |
| Close Connection | This function will end the communication connection with the headless sensor device. |

It is important to note that other functions not shown in Table 1 may additionally be available in other embodiments. Once the mobile communication device 212 establishes a communication link with the headless sensor device 200, where the SDAP 210A and 210B manageability code is cross-compatible, this functional interface may be established to allow logic on the mobile device to call any or all of these functions (and potentially more that are not listed).

Additionally, in many embodiments, two or more of these functions can be called through a single subroutine instruction sent to the headless sensor device 200. For example, in many embodiments, a sensor discovery phase may include the mobile communication device 212 sending a discovery instruction to the headless sensor device 200 and, as a result, the headless sensor device 200 may return the results of the sensor type detection, sensor payload details, sensor protocol version, and data transfer type functions all at once to complete a predetermined group of functions for a discovery phase. This may allow minimization of packets sent from the mobile communication device 212 to the headless sensor device 200.

In many embodiments, the headless sensor device includes voltage regulation logic 218. Voltage regulation logic 218 couples the headless sensor device to a power source 220 and regulates the power being delivered to the headless sensor device 200. In different embodiments, the power source 220 may be an alternating current (e.g., being plugged into a standard electrical grid) or a direct current (e.g., being coupled to a battery).

Additionally, in many embodiments, power management logic (PML) 222 commands the voltage regulation logic 220 to supply a given amount of power to the headless sensor device 200. This amount of power may be modified over time to make available two or more different power states for alternate modes of operation of the headless sensor device 200. For example, when the headless sensor device 200 is gathering measurement data and/or communicating with the mobile communication device 212, it may be in a full power, fully operational state, whereas, when the headless sensor device 200 is not gathering data or communicating with the mobile communication device 212, it may be in a low power state, semi-functional state.

A low power state may limit the functionality of the device to scanning for a wake event. There may be a list of wake events that can activate the headless sensor device by causing the PML 222 to command the voltage regulation logic to fully power up the device. A wake event may include an open connection command function (from Table 1) received from the mobile communication device 212. Another potential wake event may be self-contained within the headless sensor device 200. For example, the headless sensor device may include a timer device 224, which remains functional in low power states, that is capable of providing a timer expire event to cause the PML 222 to power the rest of the headless sensor device 200. Setting the timer controls, including whether to utilize timer functionality and the length of time the timer 224 is initially set at, may be implemented during a headless sensor device 200 initialization phase.

In some embodiments, many of the components in the headless sensor device 200 are integrated into a system on a chip (SOC) device 226. FIG. 2 simply shows a single example of a certain set of components potentially integrated into the SOC 226. In different embodiments that are not shown in FIG. 2 one or more additional components may be integrated into SOC 226 or one or more components shown as integrated may actually be discrete components located elsewhere in the headless sensor device 200. In yet other embodiments that are not shown, certain components within the SOC are actually integrated into the processor 204. For example, in some embodiments, PML 222 and timer 224 may be integrated into processor 204 or volatile memory 206 may be integrated into processor 204.

The mobile communication device 212 (e.g., a smartphone) may also include components to allow the device to operate and communicate with the headless sensor device 200. For example, in the embodiment shown in FIG. 2, the mobile communication device 212 includes its own I/O and communication logic 228 to allow communication across communication link 216. In the case where communication link 216 is a wireless link, the I/O and communication logic 228 may include a transceiver with an antenna. Additionally, the mobile communication device 212 may include its own processor, volatile memory 232, and NVM 234. The NVM 234 may store the SDAP 210B manageability code discussed above.

In many embodiments, the NVM 234 also may store a headless sensor device (HSD) table 236 that includes information gathered about the list of known headless sensor devices, one of which may be headless sensor device 200. The HSD table 236 may create a unique identifier per headless sensor device and an address to allow for further communication with a given headless sensor device when needed.

In cases where the communication link 216 is wireless, the communication link 216 infrastructure and protocol utilized may or may not have a large range to effectively communicate with the mobile communication from any distance. In embodiments where the wireless link infrastructure and protocol do allow for distant links (e.g., a cellular network), the HSD table 236 may include the cellular telephone number each known headless sensor device. In other embodiments where the wireless link infrastructure and protocol do not allow for distant links (e.g., a Bluetooth® network), the mobile communication device 212 and each of the headless sensor devices, such as device 200, may effectively ping for a mutual discovery between two in-range devices. In some embodiments, the headless sensor devices will emanate a ping to signify they are available in the area, in other embodiments, the mobile communication device will emanate the ping. In each of these embodiments, the device not emanating the ping would be searching for any in-range devices pinging the network.

In other embodiments, the communication link 216 is a wired connection. In these embodiments, each headless sensor device in the grid of devices may be coupled to a network that allows for IP addresses to be allocated to each headless sensor device. The list of IP addresses may be stored in the HSD table 236 on the mobile device 212. In yet other embodiments, the communication link may be an external Universal Serial Bus (USB) cable or another short range cable (proprietary or standard), which allows a direct same location coupling to be made manually between the mobile device 212 and a given headless sensor device.

In yet other embodiments that are not shown in FIG. 2, the headless sensor device 200 may be embedded within the mobile communication device 212. In an extreme case, each mobile phone issued to any customer within an entire geographical region may be equipped with an embedded/integrated headless sensor device. The mobile phone customers would naturally move throughout a region on a daily basis each in unique ways. The cellular phones may include a location service device, so for each measurement taken by the headless sensor device in the phone, a time/date/location stamp may be attached to the actual measurement data. This data may be stored in non-volatile memory and uploaded to a central server to analyze the data, for example, once a day.

Figure 3:
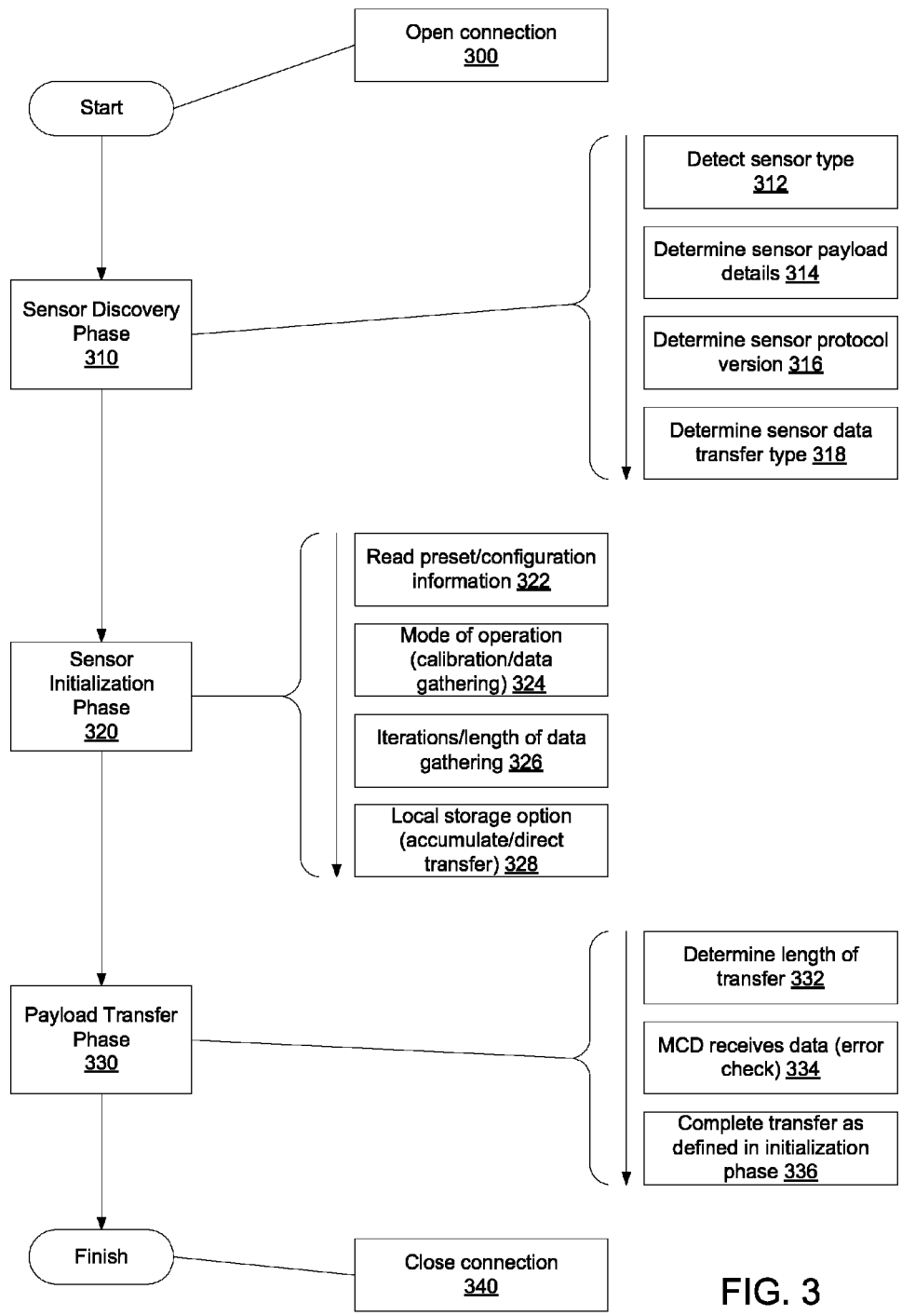
FIG. 3 is a flow diagram of an embodiment of a process to communicatively link a mobile communication device with a headless sensor device, take one or more sensor measurements, and transfer the measurement data to the mobile communication device.

FIG. 3 is a flow diagram of an embodiment of a process to communicatively link a mobile communication device with a headless sensor device, take one or more sensor measurements, and transfer the measurement data to the mobile communication device.

The process in FIG. 3 is performed by processing logic that may include hardware (e.g., logic circuits), software (e.g., application code), firmware (e.g., microcode), or a combination of any of the above three types of processing logic.

Turning to FIG. 3, the process starts with processing logic initiating an open connection between a mobile communication device and a headless sensor device (processing block 300). The connection may be opened in a number of ways, but generally speaking the mobile communication device and headless sensor device establish an adequate communication link to allow data to transfer between the two devices. For example, the mobile communication device may send data in the form of a function-based command to the headless sensor device and the headless sensor device may send a payload of measurement data back to the mobile communication device.

In many embodiments, once the connection between the two devices is opened, communication between the two devices may take the form of function calls (essentially instructions) sent from the mobile communication device to the headless sensor device to instruct the headless sensor device to do one or more of many possible functions the headless sensor device is capable of performing. The headless sensor device, as a result of receiving one or more of these function calls from the mobile communication device, may initialize/calibrate itself, take a measurement from the sensor head, report status back to the mobile communication device, send a payload of measurement data to the mobile communication device, or any one or more other functions it is capable of performing.

Returning to FIG. 3, once the connection between the two devices is opened, then processing logic may enter a sensor discovery phase (processing block 310). This phase allows the determination of the type of sensor as well as the data payload details and data transfer specifics. Once entering into the sensor discovery phase, processing logic detects the sensor type (processing block 312), determines the sensor payload details (processing block 314), determines the sensor protocol version (processing block 316), and determines the sensor data transfer type (processing block 318). Each of these processing blocks may be completed with separate instructions being sent to the headless sensor device processing logic or a single instruction (such as a "discovery" instruction) may be sent that commands the headless sensor device to perform all of these logical steps in a row and send the results of processing blocks 312-318) back to the mobile communication device together.

Once the mobile communication device receives this information, processing logic within the mobile communication device then enters the sensor initialization phase (processing block 320). Whether a single initialization instruction or multiple instructions are sent to the headless sensor device, processing logic will then read any preset/configuration information (processing block 322) for the headless sensor device to configure itself with the requirements for sensor data collection.

Processing logic will then determine what mode of operation the headless sensor device is utilizing (i.e., whether the headless sensor device is in a calibration routine or whether it's actually collecting measurement data to send to the mobile communication device) (processing block 324). Next, processing logic determines whether the data collection is going to utilize multiple iterations or a single iteration of measurement and how long the data is to be gathered (i.e., what total amount of time) (processing block 326). Finally, processing logic determines whether the headless sensor device will be accumulating data using local storage within the headless sensor device or whether the headless sensor device is to immediately packetize any measurement data that is retrieved from the sensor head and sent to the mobile communication device without using its local non-volatile storage to store the collected measurement data for any period of time (processing block 328). At this point the sensor initialization phase is complete. This detection generally takes the form of processing logic within the mobile communication device sending an instruction to the headless sensor device inquiring about the sensor type. The headless sensor device can then return its type in a packet of information to the mobile communication device.

Once the sensor initialization phase has been completed, processing logic then enters the payload transfer phase (processing block 330). In the payload transfer phase processing logic in the mobile communication device then determines the length of the transferred data, to determine what portion of the data received is the end (processing block 332). The mobile communication device (MCD) then receives the measurement data payload sent from processing logic in the headless sensor device (processing block 334). In many embodiments, an error check mechanism may be implemented to determine if the amount of data received matches the length of transfer information that was previously sent. Other forms of error checking and correction may also be present to mitigate the loss of any potential data sent between the devices. Finally, processing logic in the mobile communication device then signals a completion of the transfer, as determined by the specific implementation defined in the initialization phase (processing block 336). The process then finishes when the connection between the two devices is closed (processing block 340).

Elements of embodiments of the present invention may also be provided as a non-transient machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of non-transient machine-readable media suitable for storing electronic instructions.

In the description above and in the claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

Claims of the invention:

1. A headless sensor device, comprising:
    a sensor head to retrieve an amount of measurement data from an environment each time the sensor head takes a measurement;
    an input/output interface to communicatively couple the headless sensor device at least to a sensor and to a mobile communication device;
    a memory;
    a non-volatile storage to store at least a first sensor data access protocol (SDAP) manageability code;
    processing logic to load at least a portion of the first SDAP manageability code into the memory, wherein the first SDAP manageability code, when executed by the processing logic, causes the processing logic to:
        calibrate the sensor head;
        determine a length of data collection;
        determine a data gathering technique of the sensor head, the data gathering technique includes one of data accumulation and direct data transfer;
        determine a length of data transfer;
        provide a sensor type to a mobile communication device attempting to discover the headless sensor device;
        provide a measurement data payload type to the mobile communication device, the measurement data payload type includes a format of each packet of data to be sent to the mobile communication device;
        provide a data transfer type to the mobile communication device, wherein the data transfer type includes one of a wired or a wireless data transfer type;
        provide at least the length of data collection, the data gathering technique, and the length of data transfer to the mobile communication device;
        cause the sensor head to take at least a first measurement;
        receive the amount of measurement data from the sensor head as a result of the taken first measurement;
        packetize the measurement data received from the sensor head into a measurement data payload of the measurement data payload type; and
        transfer the measurement data payload to the mobile communication device;
    wherein the headless sensor device is exclusive of a display.

2. The headless sensor device of claim 1, further comprising:
    a battery to provide power to at least the input/output interface, the memory, the non-volatile storage, and the processing logic.

3. The headless sensor device of claim 1, wherein the measurement data received from the sensor head comprises analog data and wherein the headless sensor device further comprises:
    analog-to-digital conversion logic to convert the analog measurement data into digital measurement data.

4. The headless sensor device of claim 1, wherein the data gathering technique comprises data accumulation, and wherein the first SDAP manageability code further causes the processing logic to:
    receive a plurality of measurement data, taken from a plurality of sensor head measurements, the plurality of measurement data is temporarily stored in the non-volatile storage.

5. The headless sensor device of claim 1, wherein the data gathering technique comprises direct data transfer, and wherein the first SDAP manageability code further causes the processing logic to:
    for each given measurement data received from the sensor head, packetize and immediately transfer the given measurement data to the mobile communication device, wherein the packetized data is not stored in the non-volatile storage.

6. The headless sensor device of claim 1, wherein the first SDAP manageability code further causes the processing logic to:
    create a delay period of time, wherein the processing logic causes the sensor head to take a single iterative measurement after each delay period of time.

7. The headless sensor device of claim 1, wherein the headless sensor device communicates wirelessly with the mobile communication device.

8. The headless sensor device of claim 1, further comprising power management logic to cause at least a portion of the headless sensor device to enter a low power state after the headless sensor device finishes any communication with one of the sensor head and the mobile communication device.

9. The headless sensor device of claim 1, wherein the headless sensor device is integrated into the mobile communication device.

10. A system, comprising:
    a headless sensor device, the headless sensor device including:
        a sensor head to retrieve an amount of measurement data from an environment each time the sensor head takes a measurement;
        an input/output interface to communicatively couple the headless sensor device at least to a sensor and to a mobile communication device;
        a headless sensor device memory;
        a headless sensor device non-volatile storage to store at least a first sensor data access protocol (SDAP) code;
        headless sensor device processing logic to load at least a portion of the first SDAP manageability code into the memory, wherein the first SDAP manageability code, when executed by the headless sensor device processing logic, causes the headless sensor device processing logic to:
            calibrate the sensor head;
            determine a length of data collection;
            determine a data gathering technique of the sensor head, the data gathering technique includes one of data accumulation and direct data transfer;
            determine a length of data transfer;
            provide a sensor type to a mobile communication device attempting to discover the headless sensor device;

provide a measurement data payload type to the mobile communication device, the measurement data payload type includes a format of each packet of data to be sent to the mobile communication device;

provide a data transfer type to the mobile communication device, wherein the data transfer type includes one of a wired or a wireless data transfer type;

provide at least the length of data collection, the data gathering technique, and the length of data transfer to the mobile communication device;

cause the sensor head to take at least a first measurement;

receive the amount of measurement data from the sensor head as a result of the taken first measurement;

packetize the measurement data received from the sensor head into a measurement data payload of the measurement data payload type; and transfer the measurement data payload to the mobile communication device;

wherein the headless sensor device is exclusive of a display; and the mobile communication device including:

a mobile device storage to store a second SDAP manageability code;

a mobile device memory; and a mobile device processing logic to load at least a portion of the second SDAP manageability code into the mobile device memory, wherein the second SDAP manageability code, when executed by the mobile device processing logic, causes the mobile device processing logic to:

communicate with the headless sensor device; and cause the headless sensor device to send at least a portion of the amount of measurement data to the mobile communication device.

11. The system of claim 10, wherein the headless sensor device further comprises:

a battery to provide power to at least the input/output interface, the memory, the non-volatile storage, and the headless sensor device processing logic.

12. The system of claim 10, wherein the measurement data received from the sensor head comprises analog data and wherein the headless sensor device further comprises:

analog-to-digital conversion logic to convert the analog measurement data into digital measurement data.

13. The system of claim 10, wherein the data gathering technique comprises data accumulation, and wherein the first SDAP manageability code further causes the processing logic to:

receive a plurality of measurement data, taken from a plurality of sensor head measurements, the plurality of measurement data is temporarily stored in the headless sensor device non-volatile storage.

14. The system of claim 10, wherein the data gathering technique comprises direct data transfer, and wherein the first SDAP manageability code further causes the processing logic to:

for each given measurement data received from the sensor head, packetize and immediately transfer the given measurement data to the mobile communication device, wherein the packetized data is not stored in the headless sensor device non-volatile storage.

15. The system of claim 10, wherein the headless sensor device communicates wirelessly with the mobile communication device.

16. The system of claim 10, further comprising power management logic to cause at least a portion of the headless sensor device to enter a low power state after the headless sensor device finishes any communication with one of the sensor head and the mobile communication device.

17. A non-transitory machine readable medium, comprising instructions stored thereon, which upon execution by a machine, cause the machine to:

calibrate a sensor head;

determine a length of data collection;

determine a data gathering technique of the sensor, the data gathering technique includes one of data accumulation or direct data transfer;

determine a length of data transfer;

provide at least the length of data collection, the data gathering technique, and the length of data transfer to a mobile communication device;

retrieve an amount of measurement data from the sensor head;

provide a sensor type to the mobile communication device attempting to discover the headless sensor device;

provide a measurement data payload type to the mobile communication device, the measurement data payload type includes a format of each packet of data to be sent to the mobile communication device;

cause the sensor head to take at least a first measurement;

receive the amount of measurement data from the sensor head as a result of the taken first measurement;

packetize the measurement data received from the sensor head into a measurement data payload of the measurement data payload type; and transfer the measurement data payload to the mobile communication device;

wherein the headless sensor device is exclusive of a display.

18. The non-transitory machine-readable medium of claim 17, wherein the instructions further cause the machine to:

when the measurement data received is analog, convert the analog measurement data into digital measurement data.

19. The non-transitory machine-readable medium of claim 17, wherein the instructions further cause the machine to:

receive a plurality of measurement data taken from a plurality of sensor head measurements; and temporarily store the plurality of measurement data in the non-volatile storage.

20. The non-transitory machine-readable medium of claim 17, wherein the instructions further cause the machine to:

for each given measurement data received from the sensor head, packetize and immediately transfer the given measurement data to the mobile communication device, wherein the packetized data is not stored in the non-volatile storage.

* * * * *